Feb. 1, 1938. E. L. FISCHER 2,106,974
FILM DRIVING MECHANISM
Filed July 10, 1935  2 Sheets-Sheet 2
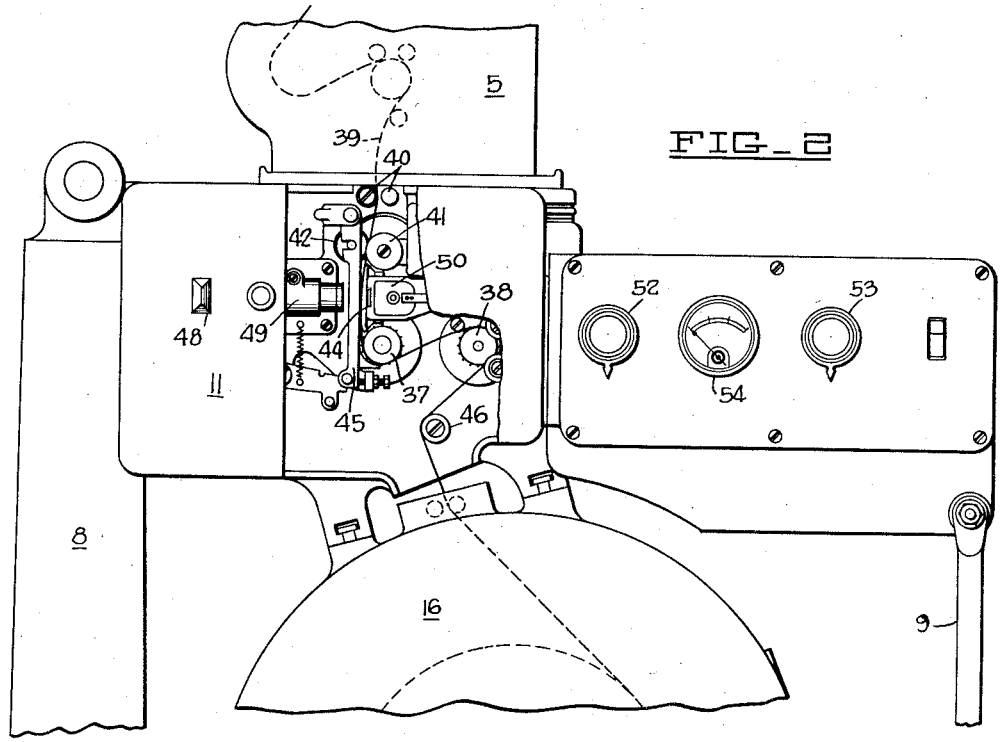
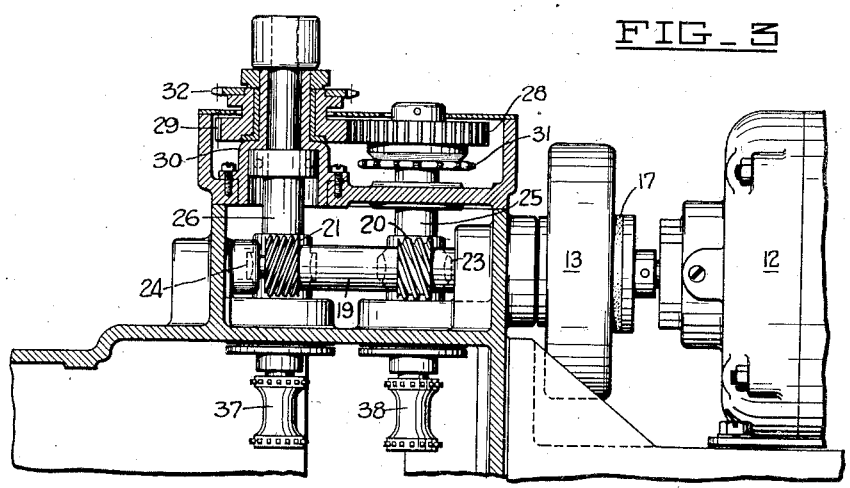
INVENTOR
Edwin L. Fischer
BY
ATTORNEY Patented Feb. 1, 1938

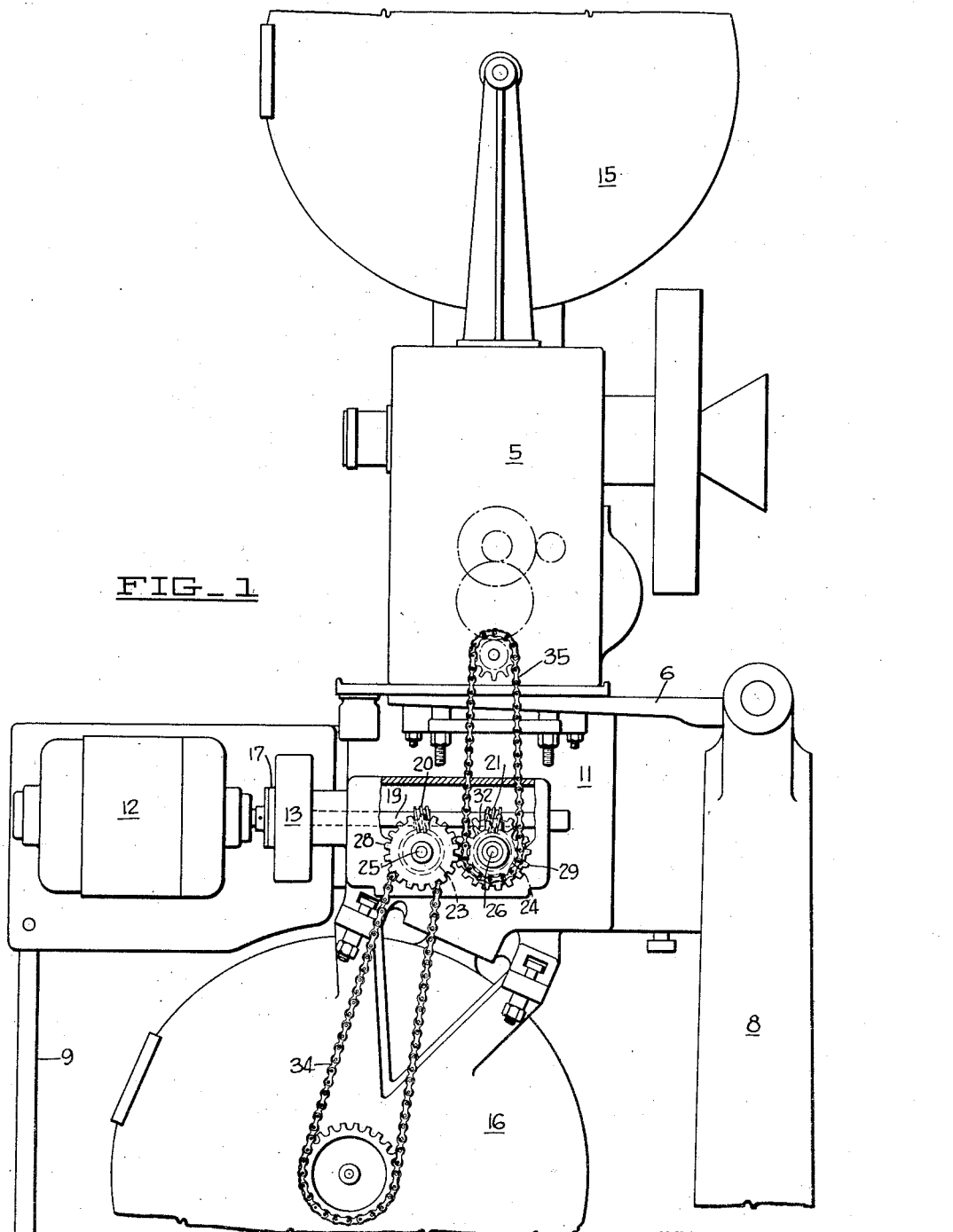

2,106,974

UNITED STATES PATENT OFFICE 2,106,974

FILM DRIVING MECHANISM

Edwin L. Fischer, Jackson Heights, Long Island, N. Y., assignor to United Research Corporation, Long Island City, N. Y., a corporation of Delaware Application July 10, 1935, Serial No. 30,755

6 Claims. (Cl. 88—16.2)

This invention relates to talking motion picture apparatus and particularly to the driving mechanism which advances the film through the different units. It is well known that one of the essentials of perfect sound reproduction is constant and uniform velocity of the film past the translation point. Inasmuch as the film is advanced by sprockets having teeth which engage the film, it is essential that the particular sprocket which propels the film past the translation point be given as constant and uniform speed of rotation as possible.

The principal parts of the moving portion of a projection machine are the intermittent picture mechanism, the continuous sound mechanism, the motor for driving these mechanisms, and the supply and take-up reels. The intermittent picture feed mechanism consists of certain reciprocating parts which produce load vibrations, while the take-up reel varies in load as the film winds thereon due to the varying diameter of the reel. If these transient effects are impressed upon the film drive sprocket for the sound unit and consequently vary the speed of the film past the translation point, distortion is introduced in the reproduced sound.

The object of the present invention, therefore, is to reduce to a safe minimum the effect of impulses and load fluctuations from reaching the drive sprocket and varying its speed.

Another object of the invention is to reduce friction on the driving portion of the mechanism directly associated with the sound drive sprocket.

A further object of the invention is to simplify the driving mechanism while retaining a rugged and efficient drive.

The invention will be more fully understood by reference to the following specification read in conjunction with the accompanying drawings, in which Fig. 1 is a side elevational view of a talking motion picture projector.

Fig. 2 is a partial sectional view of the sound reproducing unit; and

Fig. 3 is a cross-sectional view of the mechanism directly associated with the film drive sprocket.

In Fig. 1 a picture projector unit 5 is mounted upon a platform which is pivoted upon a standard 8 and further supported by a post 9. Under the platform 6 is mounted a sound reproducing unit 11 with a motor 12 having a flywheel 13.

Above the unit 5 is a supply reel magazine 15 and below the unit 11 is a take-up reel magazine 16. The motor is coupled to the flywheel by a flexible coupling disc 17, flywheel being mounted upon a shaft 19 having worms 20 and 21 driven thereby. The worms 20 and 21 are meshed with pinion gears 23 and 24 upon counter or sprocket shafts 25 and 26, respectively. Mounted upon the shaft 25 is a spur gear 28 intermeshed with a spur gear 29 mounted upon a quill 30 concentric with shaft 26 (see Fig. 3). Also, upon the shaft 25 is a sprocket wheel 31, this sprocket wheel driving a chain 34 which in turn rotates the take-up reel in magazine 16 in the proper direction. A sprocket 32, driven by gear 29, drives a chain 35 which, in turn, drives, in the proper direction, the picture projecting mechanism shown diagrammatically by broken lines in sections 5 of Figs. 1 and 2.

Mounted on one end of shaft 26 is a film drive sprocket 37 which is to be maintained at the proper speed, and on one end of shaft 25, a holdback sprocket 38. As shown in Fig. 2, a film 39 supplied from the reel in magazine 15 progresses through the picture projecting unit, enters the sound reproducing unit 11 between rollers 40, and then between a flywheel roller 41 and a pressure roller 42, past a translation point between a shoe 44 and a gate 45, around the drive sprocket 37 over a hold-back sprocket 38, around an idler roller 46, and into the magazine 16 where it is wound on the take-up reel located therein.

Light from a constant exciter light source located behind the window 48 is transmitted through an optical slit assembly 49, through the film 39 at the translation point, and on a light sensitive device housed in the mounting 50. To the right of unit 11 shown in Fig. 2 is a control panel having a rheostat 52 for the constant intensity lamp, a rheostat 53 for the generated currents, and a meter 54 to indicate the lamp current.

As explained above, the motor 12 drives the flywheel 13 through the disc 17, this resilient coupling smoothing out certain fluctuations in motor speed which may be caused by energy fluctuations. The flywheel 13, therefore, stabilizes the speed of rotation of shaft 19 carrying the worms 20 and 21. The worm 21 drives the shaft 26 and the drive sprocket 37 directly connected thereto, the worm 21 and gear 24 being specially ground to eliminate the accumulative error in tooth spacing and to correct the error in tooth shape in order that the driven gear may have the exact proportionate angular velocity as the driving gear at all times.

Since all the load on these gears has been eliminated except a short length of film advanced by sprocket 37, these gears retain their original accuracy over a long period of use. The worm 20 and gear 23 which may be of the same high efficiency type as the sound sprocket worm and gear, drives the remainder of the load consisting of the intermittent picture projecting mechanism and the take-up reel. The take-up reel is driven directly by sprocket wheel 31 on shaft 25 together with chain 34, while gear 28 on this shaft drives the intermittent feed through the gear 29 and sprocket wheel 32. The sprocket 32 which drives the intermittent picture feed mechanism through the chain 35 rotates concentrically about the sound sprocket shaft 26 but upon a quill 30, this transposition being necessary to provide the proper direction of travel and utilize the space to the best advantage.

In this arrangement of worms, gears and chains, the motor used is oversized to prevent load fluctuation thereon from unduly affecting its speed. Furthermore, the use of the quill conserves space in obtaining the required transitions of motion while the major portion of the load is placed on gears and shafts independent of the gears and shaft driving the sound feed sprocket.

Although this invention has been disclosed embodied in a sound reproducing unit, it is to be understood that the principle involved is also applicable to a sound recorder in which a single driving unit operates the film reels and the sound recorder sprocket.

What is claimed is:

1. In a system for the projection of talking motion pictures, the combination of a motor, a shaft driven by said motor, a plurality of counter-shafts driven from said motor shaft, a gear driven by one of said counter-shafts, a second gear concentric with a second counter-shaft and intermeshed with said first gear, intermittent picture projecting mechanism driven by said second gear, and a take-up mechanism driven by said first gear.

2. A system for rotating a film drive sprocket at a substantially constant speed from a motor adapted to drive other film mechanism comprising a drive shaft resiliently connected to said motor, said drive shaft having a flywheel mounted thereon, a counter-shaft connected to and driven by said motor drive shaft, said counter-shaft having said film drive sprocket mounted thereon, a second counter-shaft connected to and driven by said motor shaft, said second shaft directly driving a portion of said film mechanism, and a second shaft mounted on a quill concentric with said first counter-shaft and driven by said second counter-shaft for operating another portion of said film mechanism.

3. In a talking picture projection apparatus, the combination of an intermittent film advancing mechanism, a continuous film advancing mechanism, a take-up reel, a motor for driving both of said mechanisms and said take-up reel, a drive shaft for said motor having a flywheel mounted thereon and resiliently connected to said motor, a counter-shaft driven by said drive shaft and having a film sprocket of said continuous film feed mechanism mounted thereon, a second counter-shaft parallel with said first shaft and having a hold back film sprocket, a gear and a chain sprocket mounted thereon, said chain sprocket driving said take-up reel, and another gear concentrically mounted with respect to said first counter-shaft intermeshed with said first gear for driving said intermittent feed mechanism.

4. A talking motion picture projector in accordance with claim 3 in which said concentric mounting means comprises a quill.

5. A film feed system comprising a drive shaft, a counter-shaft having a sound sprocket thereon, means for driving said counter-shaft and sound sprocket from said drive shaft, a second counter-shaft adapted to be driven by said drive shaft, said second counter-shaft having a gear thereon, means adapted to be driven by said second counter-shaft, said means including a gear meshed with said first gear and rotating concentrically of said first counter-shaft but independently thereof, and means for connecting independent loads to each of said gears.

6. A film feed system in accordance with claim 5 in which said drive shaft has a flywheel mounted thereon and driven by a motor resiliently connected thereto.

EDWIN L. FISCHER.